United States Patent [19]
Schleifstein

[11] Patent Number: 6,010,646
[45] Date of Patent: Jan. 4, 2000

[54] ELECTROCONDUCTIVE COMPOSITION AND METHODS FOR PRODUCING SUCH COMPOSITION

[75] Inventor: Robert A. Schleifstein, Edison, N.J.

[73] Assignee: Potters Industries, Inc., Carlstadt, N.J.

[21] Appl. No.: 08/834,038

[22] Filed: Apr. 11, 1997

[51] Int. Cl.$^7$ ................................................. H01B 1/20
[52] U.S. Cl. ........................ 252/500; 252/512; 252/521.5
[58] Field of Search .................................. 252/500, 512, 252/513, 514, 521.5; 428/403, 407; 277/590; 264/104

[56] References Cited

U.S. PATENT DOCUMENTS

| | | | |
|---|---|---|---|
| 4,299,736 | 11/1981 | Datta | 252/506 |
| 4,419,279 | 12/1983 | Abrams | 252/514 |
| 4,547,312 | 10/1985 | Graiver et al. | 252/513 |
| 4,683,082 | 7/1987 | Ehrreich | 252/506 |
| 4,716,081 | 12/1987 | Ehrreich | 428/403 |
| 4,777,205 | 10/1988 | La Scola et al. | 524/440 |
| 4,822,523 | 4/1989 | Prud'Homme | 252/511 |
| 4,836,955 | 6/1989 | Ehrreich | 252/512 |
| 4,857,233 | 8/1989 | Teichmann et al. | 252/513 |
| 5,075,038 | 12/1991 | Cole et al. | 252/514 |
| 5,091,114 | 2/1992 | Nakajima et al. | 252/514 |
| 5,175,056 | 12/1992 | Walther et al. | 428/403 |
| 5,207,950 | 5/1993 | Ehrreich | 252/518 |
| 5,227,093 | 7/1993 | Cole et al. | 252/512 |
| 5,229,037 | 7/1993 | Nakano et al. | 252/512 |
| 5,286,416 | 2/1994 | Teichmann et al. | 252/512 |
| 5,344,593 | 9/1994 | Chiba et al. | 252/514 |
| 5,384,075 | 1/1995 | Okami | 252/511 |
| 5,399,432 | 3/1995 | Schleifstein et al. | 428/403 |
| 5,498,644 | 3/1996 | Reo | 523/218 |
| 5,643,592 | 7/1997 | Jacobson et al. | 424/409 |
| 5,653,875 | 8/1997 | Betz et al. | 210/198.2 |

OTHER PUBLICATIONS

Gächter, R. and Müller, H., "Product groups and their specific chemical and technical performance", *Plastics Additives Handbook*, 204–210 No Date.

*Primary Examiner*—Mark Kopec
*Attorney, Agent, or Firm*—Whitman Breed Abbott & Morgan LLP

[57] ABSTRACT

The invention relates to an electroconductive composition comprising a polysiloxane matrix, electroconductive particles dispersed therein and an amount of a nucleophilic chemical species capable of impeding an increase in the resistivity of the composition, the nucleophilic chemical species being substantially unreactive with the particles and the matrix, and not causing any substantial impairment of the tear strength and tensile strength properties of said matrix; electroconductive composite comprising the electroconductive composition; and methods for making the electroconductive composition.

23 Claims, No Drawings

ELECTROCONDUCTIVE COMPOSITION AND METHODS FOR PRODUCING SUCH COMPOSITION

FIELD OF THE INVENTION

This invention relates to a conductive composition comprising a polysiloxane matrix and a conductive composite dispersed therein, to the conductive composite used in formulating such composition, and to methods for making the composition and the conductive composite.

BACKGROUND OF THE INVENTION

The incorporation of conductive particles in a matrix material to form a conductive composition is in and of itself known. For example, U.S. Pat. No. 4,822,523 discloses an adhesive, electrically conductive, composition consisting of an epoxide resin in which are dispersed particles of silver or other electrically conductive metals such as gold, nickel and copper. Another variation reported in such patent is a conductive composition comprising a para-phenylene polysulfide and silver particles. However, though relatively simple in concept, this technology has apparently been unsatisfactory. The use of solid particles of noble metal, to benefit from their high conductivity, entails a very high cost. Moreover, the matrix compositions can be so rigid that they are incapable of satisfactorily withstanding stresses resulting, for instance, from differential thermal expansion. The aforementioned patent also discloses compositions which are reportedly better able to withstand differential expansion, consisting of a silicone elastomer and silver particles. But, these compositions are also said to be disadvantageous insofar as they reflect a compromise between the competing requirements of maintaining a storage life of satisfactory duration and (on the other hand) optimizing the rate of cross-linking; furthermore, such compositions require the presence of reinforcing fillers (such as fumed silica) which are acknowledged as incompatible with securing satisfactory electrical conductivity.

The art has sought to develop modified conductive filler materials which are, at the same time, acceptably conductive but less expensive than solid noble metal particles. This has led to the popularization of alternatives in which a core of inexpensive metal (such as copper) or inorganic material (such as glass, mineral, etc.) is coated with a conductive metal such as a noble metal, for instance, silver or gold. Also available are composite particles such as aluminum, or noble-metal-coated aluminum, which have embedded therein or otherwise operatively associated therewith a further conductive component such as tungsten carbide or other conductive refractory metal (see, for example, U.S. Pat. Nos. 5,175,056 and 5,399,432).

The patent literature also documents other efforts to address the aforementioned shortcomings. U.S. Pat. No. 4,716,081 contains disclosure of a conductive composition comprising a resin matrix and silver-plated copper particles which have been heat-treated before such incorporation; prior to silver-coating the copper core is pre-treated for several minutes in a bath of silver-complexing, or silver-chelating agent, such as a sodium cyanide or potassium cyanide bath. U.S. Pat. No. 4,683,082 discloses a polymeric matrix containing conductive particles, and multifunctional agents such as organotin compounds which are utilized on the conductive particles or in the binder system in quantities effective to secure a favorable interface between the conductive particles and polymeric matrix along with satisfactory shelf-life of the organic binder system and electroconductive stability of the particles. And U.S. Pat. No. 5,091,114 discloses an organic resin, such as a thermoset resin, photocurable resin, irradiation-curable resin, thermoplastic resin, or the like, which includes silver-containing particles.

Also, U.S. Pat. No. 5,207,950 is directed to polymer compositions—preferably selected from the group of polyesters, vinyl chloride copolymers, vinylidene chloride copolymers, polyurethanes, ethylene copolymers, acrylate polymers, acrylate copolymers and mixtures thereof—which contain metal-based conductive particles and chlorided metal-based conductive particles. The chlorided particles are subject to a treatment such that the chloride is at least present on the particle surfaces prior to inclusion in the composition; this is typically effected by subjecting a metal-based particle to treatment with a metal-chloride forming solution such as aqueous sodium hypochlorite ferric chloride, sodium chloride or potassium chloride.

Of particular interest are conductive compositions having a silicone-based matrix system. These are valued for their superior elastomeric properties, which enable production of shaped electroconductive bodies suitable for applications which require both high conductivity and high flexibility. Depending on the formulation of the matrix, these can be used to form articles of manufacture such as conductive gaskets, or conductive adhesives.

For example, previously mentioned U.S. Pat. No. 4,822,523 is directed to an electrically conductive composition containing an elastomeric thermoplastic polyblock organopolysiloxane copolymer (formed in a reaction catalyzed by platinum chloride derivatives) and particles with electroconductive properties, such as carbon, titanium carbide, silver, or gold, or a core of any such material or nickel, copper or lead clad with a conductive material.

See also: U.S. Pat. No. 4,777,205 which is directed to an organopolysiloxane composition containing silver-coated mica particles and carbon black, a platinum catalyst, and a platinum-catalyst inhibitor; U.S. Pat. No. 5,227,093 which is directed to an organosiloxane composition (cured with a platinum catalyst) containing silver or silver-coated particles treated with a fatty acid ester prior to their incorporation; and U.S. Pat. No. 4,836,955 which discloses a silicone binder system (having as a first component a vinyl gum type of silicone resin and as a second component a liquid silicone resin) containing silver-plated copper particles for use as a gasket, such formulation exhibiting improved electroconductive stability when the particles are subjected to a long-term heat treatment prior to their incorporation in the matrix; U.S. Pat. No. 5,075,038 which describes a number of different embodiments, such as a siloxane silicone pressure-sensitive adhesive containing silver-plated copper powder, an electrically conductive stock comprising a mixture of siloxane polymer with a curing agent (aminosilane or aminosilazane) and electrically conductive particles having an outer surface of noble metal, vinyl-containing organopolysiloxanes and organopolysiloxanes having Si-bonded hydrogen atoms along with a catalyst and a conductive material, a polymeric composition (e.g., an epoxy resin, silicone, fluorosilicone, polyurethane or long-chain hydrocarbon) loaded with silver flakes, and a silicone composition formed using a platinum catalyst and silicone polymer including amounts of aromatic-containing radicals or ethylenically unsaturated hydrocarbon radicals (e.g., vinyl radicals, in addition to those commonly used as end blockers) as well as silver particles or silver-coated copper, solid glass, hollow glass, mica flakes, nickel granules and spheres, short glass and ceramic fiber.

Further, U.S. Pat. No. 5,229,037 describes multiple systems such as: a highly electroconductive silicone rubber composition containing noble metal powder or an inorganic material (for instance, glass, mica, alumina, carbon and the like) coated or plated with silver, nickel, etc.; a silicone rubber composition obtained by compounding a metallic electroconductivity-imparting agent with an insulating silicone rubber composition in combination with a fine powder of a cured silicone rubber (or alternatively carbon black); and an electroconductive composition comprising a diorganopolysiloxane, spherical particles of a cured silicone elastomer, a metallic electroductivity-imparting agent in finely divided form, and a curing agent, as well as (optionally) a liquid organosilicone compound.

Still other variations are described in: U.S. Pat. No. 5,344,593, which relates to an electroconductive composition comprising a vinyl-group-terminated polydimethylsiloxane, optionally containing other polymer components, a hydrosilyl-group-containing polydimethylsiloxane to act as a curing agent, and electroconductive particles; U.S. Pat. No. 5,384,075, which is directed to a system comprising an organopolysiloxane having at least two alkenyl groups in its molecule, an organohydrogenpolysiloxane having at least two silicone-bonded hydrogen atoms in its molecule, a platinum group metal catalyst, an organosilicone compound having at least one silicone-bonded hydrogen atom and at least one silicone-attached epoxy-group-containing organic group or alkoxy group, and an electrically conductive filler, and (optionally) a flame retardant such as benzotriazole or an addition-reaction-controlling agent such as vinyl-group-containing siloxane; U.S. Pat. No. 5,498,644 directed to an electrically conductive silicone elastomer produced, for instance, by mixing vinylmethylsiloxane having a platinum catalyst with methylhydrogensiloxane and also with silver-coated ceramic microballoons, a Teflon powder and a heat curable silicone rubber system containing an inhibited platinum catalyst; and U.S. Pat. No. 5,091,114 directed to a composition produced by removing water from an emulsion having a dispersed phase of elastomer (e.g., based upon polydiorganosiloxane) and a continuous phase of water, said composition also containing electrically conductive metal coated spheres.

However, despite the proliferation of electroconductive siloxane-based systems as covered above, the technology continues to suffer from a fundamental problem. Though electroconductivity may be acceptable and resistivity low initially, conductive compositions containing conductive particles and a siloxane matrix or the like frequently exhibit substantial increases in resistivity over time, such that within too short a period the compositions are not acceptably electroconductive any longer. This is a very significant drawback, as it means that often within three weeks or less after production, during storage or use, the electroconductive properties of the composition in question are deteriorating. Overcoming the problem by providing a siloxane-based conductive composition which reliably exhibits stable, high electroconductivity for a sustained duration would be a substantial advance of the art.

OBJECTS OF THE INVENTION

One general object of the invention, therefore, is to provide a new and improved conductive composition having a polysiloxane matrix which maintains an acceptably low resistivity and high electroconductivity in sustained fashion during storage and/or use.

A further object of the invention is to provide a new conductive composition which is economical and reliable in operation.

Another object of the invention is to provide a novel method for making a conductive composition as aforesaid.

Still another object of the invention is to provide a conductive composite that is useful as conductive filler to enable formulation of a conductive composition as aforesaid.

Yet another object of the invention is to provide a conductive composite which causes the overall electroconductivity of a composition in which it is incorporated to be maintained at an acceptably high level during storage and/or use.

Yet another object of the invention is to provide a method for making such conductive composite.

SUMMARY OF THE INVENTION

Thus, in one of its aspects, the invention is an electroconductive composition comprising a polysiloxane matrix, electroconductive particles dispersed therein, and an amount of a nucleophilic chemical species capable of impeding an increase in the resistivity of said composition, said species being substantially unreactive with said particle and said matrix, and not causing any substantial impairment of the tear strength and tensile strength properties of said matrix.

In accordance with another aspect, the invention is a method for making such electroconductive composition which comprises combining electroconductive particles and one or more precursor components capable of being formed into a polysiloxane matrix, further incorporating in said combination a nucleophilic chemical species, and curing said one or more precursor components to form said matrix, said nucleophilic chemical species being substantially unreactive with said particles and said matrix, and being incorporated in said combination in an amount such that there is present in said composition sufficient species to impede an increase in the resistivity of the composition, but not an amount so great as to cause any substantial impairment of the tear strength and tensile strength properties of said matrix.

According to a further aspect the invention is an electroconductive composite comprising an electroconductive particle and, deposited thereon, a nucleophilic chemical species such that, in an electroconductive composition having a polysiloxane matrix and formed with a multiplicity of said composite, there is a sufficient amount of said species present to be capable of impeding an increase in the resistivity of said composition, said species being substantially unreactive with said particle and said matrix, and not causing any substantial impairment of the tear strength and tensile strength properties of said matrix.

And, according to still a further aspect, the invention is a method for making such electroconductive composite, which comprises depositing on an electroconductive particle a nucleophilic chemical species such that, in an electroconductive composition formed with a multiplicity of such composite and having a polysiloxane matrix, there is a sufficient amount of said species to be capable of impeding an increase in the resistivity of said composition, said species being substantially unreactive with said particle and said matrix, and not causing any substantial impairment of the tear strength and tensile strength properties of the matrix.

The compositions of the invention can be used as shielding, as conductive elements, or in electrostatic charge dissipation applications. They can be configured in various shapes to form gaskets or other articles which, due to the conductive nature of such compositions, exhibit good electrical conductivity and correspondingly low resistivity and are typically flexible and resilient.

Practice in accordance with this invention results in substantial advantages. Without any sacrifice in the benefits attendant upon use of a siloxane-based matrix, long-term electroconductivity of compositions formulated in accordance with the invention is sustained at an acceptably high level and, correlatively, resistivity is kept at an acceptably low level. The improvement is consistent and reliable, such that results do not vary significantly from one conductive composition to another and from one batch of conductive composites to another. For instance, the benefits of the invention are significant for compositions configured by extrusion, wherein the polysiloxane matrix is typically cured with organoplatinum compounds, which appear to be linked to increases in resistivity over time. Incorporation of a nucleophilic chemical species in accordance with the invention apparently counters the increase of resistivity and erosion of conductivity during storage or long-term use.

Various other objects, advantages and features of the invention will become readily apparent from the ensuing description.

DESCRIPTION OF CERTAIN PREFERRED EMBODIMENTS OF THE INVENTION

A central feature of the invention is the discovery that an increase in the resistivity of electroconductive compositions over time is impeded by the incorporation of an effective nucleophilic chemical species in such composition. Nucleophilic chemical species which are effective in accordance with the invention are those that, when present in amounts not having a material effect on the curing of the polysiloxane matrix, nonetheless have sufficient electron donor capacity to offset the cause(s) of creeping resistivity, i.e., an increase in resistivity occurring gradually in the days and weeks following production of such composition. By the expression "material effect on the curing of the polysiloxane matrix" I mean a substantial impairment of the tear strength and tensile strength properties of the polysiloxane matrix vis-a-vis those which would be expected with conventional practice not involving the use of an effective nucleophilic chemical species (as typically measured using a gasket formed of the electroconductive composition). Such properties are routinely derivable by or known to one of ordinary skill in the art. An example is tear strength and tensile strength properties obtained with the utilization of commercially available precursors of the polysiloxane matrix which contain a conventional amount of an inhibitor. Such systems are utilized for the purpose of increasing the working life of the curable mixture; even though the inhibitor has the effect of substantially impairing tear strength and tensile strength properties of the matrix, exposure of the mixture to elevated temperature overcomes that effect and permits curing to be achieved. Incorporation of an effective nucleophilic chemical species in accordance with my invention should not, even in the presence of an inhibitor, prevent successful curing and attainment of the expected tear strength and tensile strength properties using the usual curing conditions.

It follows that incorporation of an effective nucleophilic chemical species such that there is no material effect on curing of the matrix, i.e., substantial impairment of tear strength and tensile strength properties, or in amount not so great as to have such effect, entails selecting a species which is sufficiently nucleophilic that amounts thereof not having the aforementioned undesirable effect nonetheless impede an increase in resistivity which would make commercial use infeasible.

A further characteristic of a suitable nucleophilic chemical species is that it be substantially unreactive with the constituent material of the electroconductive filler in the conductive composition, as well as the matrix material and the precursor(s) thereof, such that the species' electron donor capacity is not impaired by extraneous chemical reactions which consume or otherwise interfere with the availability of the species' electrons. In connection with this latter point, a nucleophilic chemical species which can be utilized in certain embodiments of the invention that involve incorporation of conductive filler materials with which the nucleophilic chemical species does not react to any detrimental extent (for example, because the species is substantially unreactive with the outermost substance of said material, such as a silver coating), would not be well-suited for utilization with conductive filler materials with which such species does react.

Suitable nucleophilic chemical species can be ions of or otherwise comprising halogen, sulfur, phosphorus or nitrogen as well as moieties comprising halogen, sulfur, phosphorus or nitrogen which are covalently bonded to or coordinated with one or more other atoms, provided that such ions and moieties fulfill the other criteria set forth in the preceding paragraph. Examples are bromide ion, chloride ion, fluoride ion, sulfate ion, sulfite ion, sulfide ion, phosphate ion, phosphite ion, nitrate ion or nitrite ion. Other examples are ammonia, amines, and elemental sulfur, as well as bromine, chlorine, fluorine or sulfur covalently bonded to or coordinated with one or more other atoms, such as in organomercaptides, mercaptobenzothiazole or mercaptobenzimidazole. The nitrogen atoms in ammonia and various amines, usually of relatively low molecular weight such as methyl amine, can also be effective nucleophilic chemical species.

Once provided with the teachings herein, the ordinarily skilled worker will be able to select the nucleophilic chemical species without undue experimentation or further invention. It will be appreciated that anionic species typically are highly effective nucleophiles. Accordingly, in certain embodiments of the invention an especially preferable nucleophilic chemical species is chloride ion. On the other hand, moieties which are covalently attached to the balance of a larger molecule are effective or not effective as nucleophilic species depending on the overall character of the molecule. By way of example, the chlorine moiety of a molecule which overall is highly electrophilic may not be a sufficiently powerful electron donor to constitute an effective nucleophilic chemical species within the scope of my invention.

The amount of nucleophilic chemical species utilized is such that, when incorporated in the conductive composition, it is sufficient to impede an increase in the resistivity thereof over time. As will be developed more fully hereinafter, the nucleophilic chemical species can be incorporated in the conductive composition in conjunction with (e.g., as a deposit on) the conductive filler material, or instead can be incorporated by admixing it with the conductive filler material and precursor component(s) of the polysiloxane matrix. (The mention of depositing or otherwise applying the nucleophilic chemical species on filler material, incorporating such species in an electroconductive composition, dissolving or dispersing such species in a liquid phase, combining such species with other components, and the like, also includes depositing or other application, incorporation, dissolving or dispersal, combination, etc. of a compound or other substance containing the species, insofar as such condition does not prevent the operability of the species in accordance with the invention.) It will be apparent to those of ordinary skill in the art that the amount of nucleophilic chemical species in the conductive composition will vary based on application, desired properties, the amount of conductive composite with which the composition is loaded, the amount of curing catalyst present, curing parameters, etc., and is determined empirically taking into account the specific prevailing conditions (once equipped with the teachings herein, one of ordinary skill in the art will be able to accomplish such determination in the normal course and without further inventive effort). Preferably, the amount of nucleophilic chemical species in the composite is from 0.005 to 0.05 weight percent of the particle, and in the composition is from 0.002 weight percent to 0.04 weight percent of the composition.

The nucleophilic chemical species is typically deposited on conductive filler material by applying to the latter a liquid solution or liquid dispersion of the species, and evaporating the liquid phase thereafter to leave a residue in contact with the conductive filler material. The conductive filler material is typically in particulate form. Accordingly, in certain good embodiments the nucleophilic chemical species is dissolved or suspended in an appropriate liquid phase, and then the solution or suspension is applied to the particles during tumbling. This operation is preferably carried out for several minutes to ensure good mixing. Then the particles and solution or dispersion are heated while tumbling at 70 to 80° C. (for instance, in an electrically heated mixer or with the aid of a gas burner) so that drying occurs. The mass of particles and residual nucleophilic chemical species deposited thereon, i.e., conductive composites as mentioned above, is then screened to remove lumps (e.g., in a sifter).

In the alternative, the nucleophilic chemical species can be incorporated during compounding of conductive filler material with one or more matrix precursor components. Typically, the nucleophilic chemical species is combined with the precursor component(s) and conductive filler particles by mixing all of them together, to yield a paste which is subsequently formed into the conductive composition containing conductive filler material, nucleophilic chemical species and desired matrix.

While not wishing to be bound by the following theory, and while not completely understanding the phenomenon, I believe that incorporation of a nucleophilic chemical species in accordance with the invention is effective to prevent increasing resistivity and prolong high electroconductivity because it decreases (and optimally eliminates) the formation in situ of substances which drive up resistivity. Their formation results from deterioration of the matrix material into one or more resistive oligomeric or other substances during storage or use, which substance(s) bleed(s) to the surface of the composition, thus leading to increased resistivity. Of course, as time goes by, more and more of the substance is produced and thus resistivity also continues to increase, with undesirable electroconductivity impairment. This phenomenon can readily be understood through consideration of electroconductive compositions processed by extrusion. In such compositions, organoplatinum compounds are typically used as curing catalysts. These organoplatinum compounds remain in the conductive composition even after they catalyze the formation of the matrix. As time goes on, those compounds, which contain an electrophilic platinum moiety, cause the matrix to depolymerize, the products of which depolymerization migrate to the surface of the conductive composition and increase its resistivity, thereby also decreasing its electroconductivity. However, the nucleophilic chemical species incorporated in accordance with the invention is an electron donor which contributes electrons to the electrophilic platinum moiety of the organoplantinum compounds, thereby decreasing the potency of the organoplatinum compounds as depolymerization catalysts. It is my belief that the more labile the nucleophilic chemical species the better able it is to confer the advantages of the invention, since this means it will be better able to migrate to the catalyst. From this it follows that the smaller the size of the nucleophilic chemical species the more likely it is to perform advantageously, assuming that it meets the other criteria already discussed. When the nucleophilic chemical species is utilized in adequate amount, the formation of depolymerization products is suppressed sufficiently to impede creeping resistivity and maintain high electroconductivity. At the same time the capability of the platinum compound (or other catalyst) to cross-link precursor components to form the matrix is not significantly reduced.

The electroconductive filler material utilized to load the conductive composition is typically in particulate form. The term "particle" or "particulate" as used herein refers to a small, discrete quantity of matter which can be spherical or irregular in shape; it can be a sphere, microballoon, flake, rod, fibril, etc. Practice of the invention encompasses use of electroconductive metal particles such as particles of nickel, iron, copper, zinc, chromium, cobalt, aluminum, silver, gold, platinum, palladium and the like, as well as particles of alloys of at least two of such metals which exhibit electroconductivity. Alternatively, the electroconductive particles can comprise a conductive or nonconductive core clad or coated with an electrically conductive material. The core can consist of an electrically conductive metal identical with or different from that of the surface. Metals such as nickel, lead and copper are often used to form the core, with a noble metal (e.g., silver, gold or the like) and/or another conductive metal such as copper forming the cladding or coating. For instance, see the disclosure of U.S. Pat. No. 4,857,233 assigned to Potters Industries, Inc., the subject matter of which is incorporated herein by reference. Additionally, the conductive particles can comprise an inorganic material core on which is clad or coated a conductive metal or metals, especially a noble metal. The inorganic core can be a glass or a mineral substance (see, for instance, U.S. Pat. No. 4,419,279 assigned to Potters Industries, Inc., the subject matter of which is incorporated herein by reference). In other embodiments the conductive particles comprise in combination an electrically conductive core material having a surface oxide layer, and an electrically conductive refractory material conductively fused with the core (e.g., coated thereon or embedded therein) with or without a noble metal or noble metal alloy interposed between the core and the refractory material; see, for instance, U.S. Pat. No. 5,175,056, U.S. Pat. No. 5,286,416 and U.S. Pat. No. 5,399,432, as well as U.S. application Ser. No. 955,906, filed Dec. 12, 1992, all of which are assigned to Potters Industries, Inc., and the subject matter of all of which is incorporated herein by reference. Suitable mixtures of two or more different types of eletroconductive particles can be used; in such case the particles are advantageously selected to be compatible with each other, at least such that corrosion of the particles does not occur.

The polysiloxane matrix is formed from a precursor curable siloxane system and typically comprises a nonconductive polymeric substance in which the electroconductive filler material is dispersed to impart electrical conductivity. The term "polysiloxane" refers to the principal component of the polymeric substance, but does not foreclose the presence of other substances. Thus, a polysiloxane matrix can contain one siloxane unit or a plurality of different siloxane units, each repeating throughout the material, such units typically being substituted by one or more organic radicals, along with other components such as a curing agent, a catalyst, one or more catalyst-inhibitors, and ingredients to improve the processibility of the curable precursor system or one or more of the properties of a cured material prepared from such system. Additional ingredients in this last category include but are not limited to reinforcing fillers such as finely divided silica, non-reinforcing fillers, filler treating agents, adhesion promoters, flame retarding agents, heat stabilizers, pigments and dyes. Depending on the degree of polymerization, the viscosity of the precursor siloxane component utilized in the curable system can range from that of a flowable liquid to that of a stiff gel, gum or resin which does not flow under the influence of gravity. The siloxane component selected will depend upon the desired processing and curing conditions in addition to the physical properties sought in the cured matrix. Polysiloxane matrix technology including the formation thereof from a siloxane component is, in and of itself, known and one of ordinary skill will be able to select suitable matrix materials, depending on the physical properties desired, and precursor siloxane components for making same without undue experimentation or further invention.

In certain good embodiments the repeating units present in the curable siloxane, and thus the cured matrix, can be one or more of $RSiO_{3/2}$, $R_2SiO$ and $R_3SiO_{1/2}$, wherein R represents an unsubstituted or substituted monovalent hydrocarbon radical. Optionally, there can also be up to about 50 mol percent of $SiO_{4/2}$ units. If the cured matrix is to be an elastomer, the curable siloxane component preferably contains an average of from 1.8 to 2.2 hydrocarbon radicals per silicon atom.

The organic groups bonded to the silicon atoms of the curable siloxane component, and thus the matrix as well, which groups are represented by the variable R in the formulae set forth in the preceding paragraph, can be monovalent hydrocarbon or halogenated hydrocarbon radicals. The hydrocarbon radicals contain from 1 to 10 or more carbon atoms. Examples are alkyl such as methyl and ethyl, alkenyl such as vinyl and allyl, cycloalkyl such as cyclohexyl, aryl such as phenyl, alkaryl such as tolyl, and aralkyl such as benzyl. Examples of halogenated hydrocarbon radicals are chloromethyl and 3,3,3-trifluoropropyl.

Diorganopolysiloxanes are often preferred as the polysiloxane matrix material. These can be represented by the formula

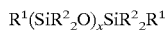

$$R^1(SiR^2{}_2O)_xSiR^2{}_2R^1$$

in which $R^2$ represents monovalent hydrocarbon radicals which are the same or not all the same, or substituted monovalent hydrocarbon radicals which are the same or not all the same, having from 1 to 18 carbon atoms, $R^1$ represents condensable groups, hydrolyzable groups, monovalent hydrocarbon radicals and monovalent hydrocarbon radicals having aliphatic unsaturation, and x is a number greater than 10. Other siloxane units are sometimes present as impurities, such as $R^2SiO_{3/2}$, $R^2{}_3SiO_{1/78}$ and $SiO_{4/2}$, wherein $R^2$ is defined in the same manner as for the immediately foregoing formula.

Preferably, the condensable groups represented by $R^1$ are hydroxyl groups, typically bonded to the terminal silicon atoms; however, they can be condensable groups other than silicon-bonded hydroxyl groups (either in part or wholly). Examples of other groups represented by $R^1$ are hydrolyzable groups such as hydrocarbonoxy groups having from 1 to 10 carbon atoms and substituted hydrocarbonoxy groups having from 2 to 20 carbon atoms, such as the methoxyethyleneoxy radical. Other hydrolyzable groups which may be partially or totally substituted for the condensable groups are acyloxy groups, amino groups, aminoxy groups, acylamino groups, oxime groups and phosphato groups. These hydrolyzable groups need not be the same as the hydrolyzable groups which are present on the curing or cross-linking agent.

In certain other good embodiments the invention is practiced utilizing vinyl-terminated dialkylsiloxanes. An example of such vinyl-terminated siloxanes is

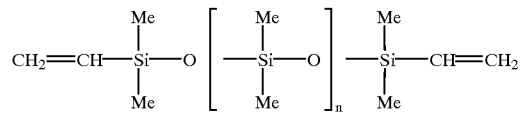

The value of "n" is at least 1, and preferably greater than 10.

And, in yet other good embodiments of the invention, fluorosilicones are used. This affords the advantages of both silicones and fluorocarbons (silicones are discussed in the preceding paragraphs; fluorination of compounds often enhances their thermal stability). In the case of siloxanes, fluorination usually begins at the gamma position of a substituent alkyl chain (due to the electropositive nature of silicon, fluorination at the alpha and beta positions can result in poor thermal stability). Consequently, commercial fluorosilicones are frequently trifluoropropyl-substituted methyl materials.

Curing of the siloxane system is typically effected via an addition format. This refers to an addition reaction of one or more suitable curing (such as cross-linking) agents to unsaturated groups of the siloxane component to form a silicone polymer, preferably an elastomer. Such curing agents are, in and of themselves, known in the art; one of ordinary skill, once in possession of the teachings herein, will be able to select appropriate ones to secure the desired result in terms of curing conditions and physical properties of the cured matrix, without undue experimentation or further invention. The curing agent can be a polyfunctional silicon hydride, such as an organohydrogenpolysiloxane, which acts as a cross-linking agent for an alkenyl-group-containing siloxane. The organohydrogenpolysiloxane typically has at least two silicon-bonded hydrogen atoms in its molecule. In the organohydrogenpolysiloxane, the hydrogen atoms can each typically be attached either to a silicon atom located at a terminal end of the molecule or to a silicon atom located at an intermediate part of the molecular chain. In addition, organic groups can be attached to the silicon atom in the same manner as with the siloxane component. These groups include, for instance, groups other than alkenyl which have been identified, in the foregoing description of the siloxane component, as suitable for attachment to a silicon atom. The organohydrogenpolysiloxane can be linear, branched or cyclic in structure and may be a mixture of such organohydrogenpolysiloxanes.

For systems often referred to as one-component room temperature vulcanizable compositions, the polyfunctional silicon hydride can be a silane of the general formula $R^2{}_aSiX_{4-a}$, wherein $R^2$ is the same as set forth above, X represents a hydrolyzable group, and a is 0, 1 or 2, as well as partial hydrolyzates of such silanes containing from 2 to 15 silicon atoms per molecule. Examples of hydrolyzable groups represented by X are acyloxy groups (—OOCR'), hydrocarbonoxy groups (—OR') and substituted hydrocarbonoxy groups (—OR"OR'), where R" is a bivalent hydrocarbon radical having from 1 to 10 carbon atoms, such as the —(CH$_2$)$_2$ radical, aminoxy groups (—ONR$_2$'), amino groups (—NR$_2$'), acylamino groups (—NR"COR'), oximo groups (—NR$_2$=CR$_2$'), phosphato groups (OO—P(OR')) and mixtures thereof. In these formulae R' represents a monovalent hydrocarbon radical or a substituted monovalent hydrocarbon radical having from 1 to 10 carbon atoms, and in appropriate instances R' can also represent hydrogen. Typical hybrid cross-linkers are methylhydrodimethylsiloxane polymers with 20–60% methyl hydrogen.

Examples of curing agents which can be employed in this invention are methyltriacetoxysilane, tetraacetoxysilane, methyltert-butoxyacetoxysilicon compounds having a total of three tert-butoxy and acetoxy groups per molecule, methyltris(cyclohexylamino)silane, methyltris-(secbutylamino)silane, isopropoxytriacetoxysilane, methyltris-(2-butanonoximo)silane, methyltris(diethylphosphato)silane and methyltris(isopropylamino) silane as well as methyltris-(diethylaminoxy)silane.

The bond-forming chemistry for polyfunctional silicon hydrides is typically the hydrosilylation reaction which proceeds according to the equation

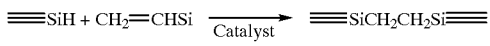

Additionally, for systems often referred to as two-component room temperature vulcanizable compositions, the siloxane can be cross-linked by the addition of polyalkoxysilanes of the formula

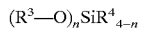

or polyalkoxysiloxanes in which the silicon atoms are linked through —Si—O—Si— linkages and the remaining valences of the silicon atoms are satisfied by R$^3$—O and R$^4$ radicals and catalysts. In the above formula, R$^3$ is a monovalent hydrocarbon radical having from 1 to 10 carbon atoms, R$^4$ is a monovalent hydrocarbon radical or a halogenated monovalent hydrocarbon radical having from 1 to 10 carbon atoms, and n is 3 or 4.

Curing is generally implemented by incorporating in the combination of matrix precursors a suitable catalyst component for the addition reaction, for instance to act as a cure accelerator. Such catalysts are also, in and of themselves, known and one of ordinary skill once in possession of the teachings herein will be able to select appropriate catalysts to achieve the desired curing, without undue experimentation of further invention. For instance, the catalyst can be any curing catalyst usable for a hydrosilylation reaction. Examples of such catalysts are platinum, palladium and rhodium catalysts, of which any one or more may be used. In the present invention, platinum catalysts are particularly preferred. Preferable, but not limitative, forms in which the catalysts can be used in the present invention include: platinum black; catalysts comprising solid platinum supported on a carrier such as alumina, silica or the like; platinum halides such as PtCl$_4$; chloroplatinic acids (e.g., hexachloroplatinic acid) and their salts; alcohol-modified chloroplatinic acids; platinum/olefin complexes, for instance, chloroplatinic acid/olefin complexes such as those with ethylene, propylene or butadiene; platinum-alcohol complexes; platinumstyrene complexes; platinum-alcoholate complexes; platinum-acetylacetonate; reaction products comprising chloroplatinic acid and monoketones, for example, cyclohexanone, methyl-ethyl ketone, acetone, methyl-n-propyl ketone, diisobutyl ketone, acetophenone and mesityl oxide; platinum/unsaturated group-containing siloxane complexes, such as chloroplatinic acid/low molecular weight vinyl-containing organosiloxane complexes, and platinum/vinylsiloxane complexes; complexes between triorganophosphine or phosphite and platinum; platinum acetylacetonate chelate; complexes between cyclic dienes and platinum, and the like. Complexes with low molecular weight organosiloxanes wherein the silicon bonded hydrocarbon radicals are vinyl and either methyl or 3,3,3-trifluoropropyl are particularly preferred because of their ability to catalyze a rapid curing of the elastomer at temperatures of at least about 70° C.

In use solid catalysts are typically disintegrated for obtaining better dispersibility or to cause the carrier therefor to have a reduced particle diameter and an increased specific surface area. In the case of a complex of platinum, for instance in the form of chloroplatinic acid, the catalyst is often dissolved in a solvent such as an alcohol, ketone, ether, or hydrocarbon, or in a vinyl siloxane such as divinylsiloxane or cyclic vinylsiloxane. Thus, platinum-divinyltetramethyldisiloxane complex in xylene, and platinum-divinyltetramethyldisiloxane complex in vinyl-terminated polydimethylsiloxane, are typical catalyst-containing systems.

Mixtures of the aforementioned siloxane components, curing agents and catalysts may begin to cure at room temperature. To obtain a longer working time or "pot life", the activity of the catalyst under ambient conditions can be retarded or suppressed by addition of a suitable inhibitor. This can be a suitable amino-group-containing or hydroxyl-group containing siloxane, organopolysiloxane, acetylene compound, ionic compound of a heavy metal, or the like. Various compounds which can be used to inhibit platinum catalyzed addition reactions are benzotriazole, acetylenic compounds such as acetylenically unsaturated secondary or tertiary alcohols, and siloxanes such as 1,3-divinyl-1,1,3,3-tetramethyldisiloxane. Other compounds which can be employed are tetramethylguanidine acetate, ethylenically unsaturated isocyanurate, phenylhydrazine, diaziridine dithiocarbamic acids, thiuram monosulfides, 2-mercaptobenzothiazole and the like. Acetylenic alcohols such as 2-methyl-3-butyn-2-ol constitute a preferred class of inhibitors that will suppress the activity of a platinum-containing catalyst at 25° C. Compositions containing these inhibitors typically require heating at temperatures of 70° C. or above to cure at a practical rate.

In certain good embodiments of the present invention, the electroconductive composition also contains an inorganic filler such ordinary silica powder, colloidal silica, aerogel silica, alumina or the like. Such filler materials typically have a reinforcing function, with a surface area of at least 50 m$^2$/g. Examples are precipitated silicon dioxide having a surface area of at least 50 m$^2$/g and/or pyrogenically produced silicon dioxide. The inclusion of such material confers upon the uncured mixture sufficient thixotropy, higher viscosity and improved dispersion stability of the electroconductive particles, and also can confer improved strength upon the cured composition. In addition, in some further embodiments of the invention it can be advantageous to include fillers that are semi- or non-reinforcing, i.e., fillers which have a surface area of less than 50 m$^2$/g. Examples of semi- or non-reinforcing fillers are metal oxides, metal nitrides, glass beads, bubbles or fibers, metallic flakes, powders and fibers such as copper, nickel and aluminum, cork, organic resins, polytetrafluoroethylene, polychlorotrifluoroethylene, polyvinylchloride, bentonite, diatomaceous earth, crushed quartz, mica, and mixtures thereof. These filler materials may be treated with, for example, trialkylalkoxysilanes, such as trimethylethoxysilane, to coat the surfaces with organosiloxy groups.

Other additives which can be incorporated in the conductive compositions of the invention include pigments, compression set additives, oxidation inhibitors, plasticizers, adhesion promoters, base stabilizers and other materials commonly employed as additives in the silicone rubber art. Also, the conductive composition of the invention can contain a heat resistance improver such as cerium oxide, a flame retardant, and non-functional organopolysiloxanes to enhance thermal shock resistance, flexibility and the like of the cured composition.

As already indicated, the nucleophilic chemical species can be applied either directly to the electroconductive particles or other electroconductive filler material, or alternatively incorporated in the precursor components of the cured electroconductive composition during compounding of the mixture to be cured.

Typically, the nucleophilic chemical species is applied to electroconductive particles or other filler material by mixing of the particles with the nucleophilic chemical species, for example, when the species is in solution or dispersion in a suitable liquid phase. As also already indicated, the species can be present per se in the solution or dispersion, or by virtue of the solution or dispersion of a substance containing the species. The application operation can be carried out, for instance, in a tumbling apparatus where the particles or other filler material are tumbled with the solution or dispersion, such as with a solution of sodium chloride in water. The amount of nucleophilic chemical species, for example, its concentration in solution, is determined empirically based on the amount of such agent which is necessary to impede the tendency to increasing resistivity (and thus preserve an acceptable level of electroconductivity) in the composition, and includes any additional amount necessary to compensate for amounts of the species which may be taken up by the tumbler, or the equipment in which formulation of the mixture to be cured, or curing, is conducted.

When the nucleophilic chemical species is incorporated at the time of compounding the mixture to be cured, it is typical to mix the siloxane components) with the curing agent(s) in the desired proportions, along with the desired amount of catalyst (for instance, contained in a catalyst system as discussed herein previously) and any other additives which are selected. The nucleophilic chemical species is incorporated in an amount which is determined empirically by the invention's practitioner based on the amount of catalyst and the other conditions which prevail, taking into account any additional increment of nucleophilic chemical species which is necessary to compensate for that which can be lost to the equipment in which formulation of the mixture to be cured, or curing, is conducted. For example, in some instances when operating on an industrial scale, it will be necessary to add an additional amount of nucleophilic chemical species to compensate for that which interacts with the reactor or other apparatus. In any case, the amount of nucleophilic chemical species which must actually be incorporated in the mixture to be cured can be derived readily by one of ordinary skill of the art once in possession of the teachings in this application, and will not involve undue experimentation or the exercise of further invention.

Any suitable conventional method can be employed to formulate a curable mixture which can be converted into the electroconductive composition of the invention. The components can be introduced into a vessel in any convenient order, optionally in various combinations of two or more. In a preferred embodiment, the siloxane component(s) is (are) introduced first as well as the catalyst, and then the other matrix precursor component(s); thereafter, the conductive filler material, or conductive composite component is introduced along with any other additives. Mixing can be simple, such as by stirring with a spatula or paddle, or it can involve the use of a mixer, such as a Baker Perkins mixer, a Ross mixer, or a 3-roll mill.

The relative amounts of the siloxane component(s) and curing agent(s) such as a silicon-bonded hydrogen-containing compound can vary within extremely wide limits. Theoretically, one silicon-bonded hydrogen atom is equivalent to one olefinic double bond or one hydrolyzable radical. For many purposes, however, it will be considered desirable to employ an excess of one of the reactants to facilitate the completion of the reaction or to ensure that the reaction product will still contain either unreacted silicon-bonded hydrogen atoms or unsaturated or hydrolyzable groups.

The method of addition of the curing catalyst is not critical. The catalyst can be mixed with the siloxane component(s) in advance, for the purpose of storage stability, prevention of uneven catalyst distribution, etc. The catalyst is frequently incorporated in the reaction mixture at room temperature, although the catalyst can be added at elevated temperature if desired. The amount of catalyst can be determined by one of ordinary skill without the exercise of further invention once equipped with the teachings of this invention. This amount is typically based on the desired actual curing rate, working life, etc. As mentioned above, a platinum catalyst is frequently employed, preferably in an amount of from 0.1 to 500 ppm by weight calculated as platinum and based on the weight of the siloxane. Catalysts which are miscible with the siloxane component, such as platinic acid, are often used in an amount (in terms of platinum) of from 0.1 to 100 ppm, preferably 2 to 50 ppm, based on the total amount of the siloxane component(s). On the other hand, solid catalysts such as platinum black and the like are often used in an amount of from 20 to 500 ppm (in terms of platinum) based on the siloxane component(s). The reaction can be conducted at room temperature or even at a temperature as low as 0° C., or at a temperature of from 150 to 300° C., though reaction is more frequently conducted at elevated temperature up to about 150° C. The time required for reaction depends on factors such as the nature of the reactants and the amount and type of catalyst.

The quantity of electroconductive filler material incorporated in the electroconductive composition (whether in the form of the filler material itself or a conductive composite as aforesaid) can be determined by one of ordinary skill, without any further invention, once in possession of the teachings herein. The amount typically depends upon the size of the particles, their morphology and their electrical conductivity. The amount of electrically conductive filler material should not be so small that the composition after curing is of unacceptably high resistivity. Nor should the amount of the electroconductive filler material be so great that the desired physical properties of the cured electroconductive composition begin to deteriorate. The amount of inorganic filler optionally incorporated is not critical to this invention as long as it does not interfere with the performance characteristics sought. Typically, the electroconductive filler material (either in the form of the material itself or a conductive composite as aforesaid) is incorporated such that the cured electroconductive composition will be loaded with 15 to 80%, especially 40 to 80%, by weight (on the basis of the composition).

The amount of inhibitor optionally incorporated can be varied depending on such characteristics as the type and amount of catalyst used, the degree of inhibition desired to be imparted, and often the type of siloxane and the type of curing agent utilized. The amount of inhibitor typically ranges from about 0.1 to about 1% by weight. The optimum concentration for a given inhibitor in a given composition can readily be determined by routine experimentation, and does not involve further invention, once the skilled artisan is in possession of the teachings herein.

In some cases, it is desirable to utilize a diluent for the siloxane component(s), the curing agent(s) and the catalyst to afford better controllability of the curing reaction and to avoid bulk solidification and untimely precipitation of the polymers. The nature and quantity of the diluent depends on a variety of factors such as the reactivity of the starting materials and their degree of solubility, and the increase in the viscosity of the reaction medium during the curing reaction. Preferably, the diluent is inert to the reactants and the catalyst under the selected reaction conditions. Examples of suitable diluents are organopolysiloxanes such as trimethylsiloxy-terminated dimethylpolysiloxanes, and organic solvents which vaporize at relatively low temperatures such as aliphatic and alicyclic hydrocarbons, halogenated or otherwise, and aromatic hydrocarbons, halogenated or otherwise, and aliphatic esters of monocarboxylic acids, for instance chlorinated hydrocarbons like trichloroethylene. The amount of diluent can vary over a wide range, for instance, from about 0 to 150% by weight, preferably from about 20 to 120% by weight, based on the weight of the siloxane. In some embodiments involving organic solvents, the diluent is preferably employed in an amount less than 20% by weight based on the reaction mixture.

The mixture to be cured, prepared as discussed above, is formed into the electroconductive composition of the invention by subjecting it to the desired reaction temperature and/or other conditions for sufficient time to effect addition of the curing agent to the siloxane component(s). Reaction temperature can vary within wide limits, according to the operating procedure adopted, for example, whether or not a diluent is used, reaction pressure, nature and amount of the catalyst, nature and amount of the siloxane component(s), nature and amount of the curing agent(s), and nature and amount of any inhibitor. Curing temperature is typically between room temperature and 220° C., preferably 150–200°. Reaction time is also variable, based on the parameters listed above. Frequently, but not necessarily, reaction time ranges from 10 minutes to 2 hours.

The mixture to be cured is typically in the form of a paste. It can be shaped prior to curing by any conventional rubber molding method such as compression molding, transfer molding, extrusion molding, injection molding, calendaring and the like depending on the desired products. While it is not essential that the electroconductive filler material be dispersed in the mixture to be cured in such manner that the mixture be electroconductive, such electroconductivity is desirably achieved after curing and solidification, for instance, as the composition decreases in volume on curing or drying as the case may be. In certain good embodiments of the invention, the application of pressure during curing improves the electroconductivity of the final composition.

The electroconductive compositions of this invention can be used in many applications where it is necessary or desirable to have an electrically conductive elastomer. Thus, the compositions are suitable for use as electrically conductive gaskets, as electrically conductive adhesives, as encapsulating agents for electronic components, as electrodes, electroconductive rubber rollers, and as cores for ignition cables. It is advantageous that articles of manufacture such as shielding gaskets and the like can be formulated to have definitive form-stable shape, e.g., of the type utilized to fit a closure to be sealed. The compositions are also useful in silk-screening processes in preparing electronic circuits.

The examples of the invention which follow are not intended to limit the claim language. Physical properties were measured at room temperature, unless otherwise stated or clear from the context. Particle sizes, when provided, relate to nominal size, i.e., average size of the aluminum or copper core prior to silvering.

EXAMPLES 1–3

To prepare conductive composites in accordance with the invention, electroconductive particles—in these Examples silver-coated aluminum (hereinafter, "Ag/Al"),—were tumbled in a rotary tumbler. In each instance, an effective nucleophilic chemical species ("NCS") was introduced by adding sodium chloride ("NaCl") in aqueous solution, or 2-mecaptobenzimidazole ("MBI") in methanol, to the particles during tumbling. The amount of aqueous NaCl or methanolic MBI was selected to give an NCS concentration in the conductive composite of 200 ppm chorine, 400 ppm chlorine or 100 ppm sulfur, as desired. Thereafter, tumbling was continued for another five minutes, and then the treated particles were oven-dried at 70° C. for thirty minutes. For each Example, the size and amount of electroconductive particles, the NCS concentration in the conductive composite, and the amount of aqueous NaCl or methanolic MBI utilized to achieve same, is indicated in the following table.

| Example | Particles | NCS Treatment | NCS Concentration |
|---|---|---|---|
| 1 | Ag/Al,60μ,1 kg | aqueous NaCl,20 wt %,1.65 g | 200 ppm Cl |
| 2 | Ag/Al,40μ,1 kg | aqueous NaCl,20 wt %,3.3 g | 400 ppm Cl |
| 3 | Ag/Al,60μ,1 kg | methanolic MBI,10 wt. %,4.69 g | 100 ppm S |

EXAMPLES 4–44

Electroconductive compositions in accordance with the invention, for use in accelerated aging tests of resistivity, were prepared as Examples 5–7, 9–11, 13–15, 17, 18, 20, 22, 23, 25, 26, 28–31, 33–35, 37–40, and 42–44. In each case, a curable mixture was formed by combining, in a Brabender Plasticorder kneader, the precursor components of a customized silicone rubber based on commercially available siloxane materials and a commercially available polyfunctional silicon hydride curing agent containing platinum as the catalytic material, along with a sufficient amount of inventive conductive composite to result in 71 weight percent loading of the final cured electroconductive composition (based on the overall cured composition). The conductive composites utilized were prepared generally according to the procedure discussed in Examples 1–3 (though one or more of the mentioned parameters, such as amounts, solution concentration, NCS type and concentration, etc., were sometimes varied as appropriate to obtain the result sought); particle size was 60μ, and NCS concentration 200 ppm, unless otherwise indicated hereinafter. The curable mixture was placed in a mold, and cured by holding it at a temperature of 175° C. for twenty minutes, to form a gasket 7 inches long, 7 inches wide, and approximately 0.08 inches thick. Then, the cured material was heated for a time of from two to four hours, at 200° C. for materials having an aluminum core and 156° C. for materials having a copper core, to drive off volatiles.

Additionally, control embodiments were prepared as Examples 4, 8, 12, 16, 19, 21, 24, 27, 32, 36 and 41. These were gaskets formed of cured compositions made along the lines discussed above, but differing from the Examples of the invention in that the compositions did not incorporate an effective nucleophilic chemical species (electroconductive particle size was 60μ unless otherwise stated).

Four or five strips, each 4 inches long, 0.5 inches wide and approximately 0.08 inches thick, were cut from each gasket, for use as specimens in an accelerated aging test to examine the resistivity characteristics of the various cured compositions over time. More specifically, the surface resistivity of the strips from each gasket was measured with a Walhalla Model 4100 OTC Ohmmeter at four or five locations on each strip, and from these values and the measured thickness an average initial volume resistivity for each gasket was calculated. Then the strips were again subjected to elevated temperature (200° C. for materials having an aluminum core and 156° C. for materials having a copper core) for forty-eight hours. Surface resistivity was again measured as above at four or five locations on each strip. Average aged volume resistivity for each gasket was then calculated.

The results of such tests on a series of gaskets formed using Ag/Al particles or conductive composite based on such Ag/Al particles, and containing either no NCS or an NCS resulting from addition of NaCl, MBI or diphenylsulfide ("DPS") as indicated, and having NCS concentration also as indicated, are reported in the following table.

| Example | NCS Additive | NCS Concentration (ppm) | Avg. Initial Resistivity (milliohm.cm) | Avg. Aged Resistivity (milliohm.cm) |
| --- | --- | --- | --- | --- |
| 4 | None | None | 3.45 | 51.32 |
| 5 | MBI | 100 | 6.37 | 117.43 |
| 6 | DPS | 100 | 4.19 | 124.17 |
| 7 | NaCl | 100 | 2.46 | 12.02 |
| 8 | None | None | 3.65 | 60.29 |
| 9 | MBI | 100 | 5.56 | 121.43 |
| 10 | DPS | 100 | 4.79 | 74.88 |
| 11 | NaCl | 100 | 2.87 | 17.89 |
| 12 | None | None | 3.04 | 16.82 |
| 13 | MBI | 100 | 4.93 | 23.33 |
| 14 | DPS | 100 | 4.21 | 32.17 |
| 15 | NaCl | 100 | 2.49 | 6.46 |

The results of further testing as aforesaid, on a series of gaskets formed using Ag/Al particles or conductive composite based on Ag/Al particles of size as indicated, and containing either no NCS or chlorine (or chloride) as indicated, with said conductive composite having NCS concentration also as indicated, are reported in the following table.

| Example | Particle Size (microns) | NCS (Chlorine) Concentration (ppm) | Avg. Initial Resistivity (milliohm.cm) | Avg. Aged Resistivity (milliohm.cm) |
| --- | --- | --- | --- | --- |
| 16 | 40 | None | 6.80 | 675.7 |
| 17 | 40 | 200 | 6.57 | 180.8 |
| 18 | 40 | 400 | 3.05 | 7.11 |
| 19 | 60 | None | 4.44 | 151.9 |
| 20 | 60 | 200 | 4.18 | 11.05 |

The results of still other testing as aforesaid, on a series of gaskets formed using Ag/Al particles or conductive composite based on Ag/Al particles, and containing either no NCS or chlorine (chloride) as indicated, with said conductive composite having NCS concentration also as indicated, are reported in the following table.

| Example | NCS (Chlorine) Concentration (ppm) | Avg. Initial Resistivity (milliohm.cm) | Avg. Aged Resistivity (milliohm.cm) |
| --- | --- | --- | --- |
| 21 | 0 | 3.58 | 99.61 |
| 22 | 100 | 3.59 | 34.29 |
| 23 | 200 | 2.22 | 5.86 |
| 24 | 0 | 4.44 | 151.90 |
| 25 | 100 | 4.79 | 66.35 |
| 26 | 200 | 3.43 | 12.68 |

The results of additional testing as aforesaid, on a series of gaskets formed using Ag/Al particles or conductive composite based on Ag/Al particles, and containing either no NCS or chlorine (chloride) or sulfur as indicated, with said conductive composite having NCS concentration also as indicated, are reported in the following table.

| Example | NCS | NCS Concentration (ppm) | Avg. Initial Resistivity (milliohm.cm) | Avg. Aged Resistivity (milliohm.cm) |
| --- | --- | --- | --- | --- |
| 27 | None | 0 | 3.95 | 120.89 |
| 28 | Chlorine | 100 | 3.09 | 36.37 |
| 29 | Chlorine | 200 | 2.64 | 12.83 |
| 30 | Chlorine | 400 | 3.21 | 35.49 |
| 31 | Sulfur | 100 | 8.47 | 42.41 |

The results of yet additional testing as aforesaid, in this case on a series of gaskets formed using Ag/Cu particles of size 44μ based on such Ag/Cu particles, and containing either no NCS or an NCS resulting from addition of NaCl, ammonium bromide ("NH₄Br"), ammonium hydrogen phosphate ("NH₄HPO₄"), sodium sulfide ("Na₂S") or MBI as indicated, with said conductive composite having NCS concentration also as indicated, are reported in the following table.

| Example | NCS Additive | NCS Concentration (ppm) | Avg.Initial Resistivity (milliohm.cm) | Avg. Aged Resistivity (milliohm.cm) |
| --- | --- | --- | --- | --- |
| 32 | None | None | 16.8 | 8.3 |
| 33 | NaCl | 100 | 6.2 | 3.3 |
| 34 | NaCl | 200 | 3.7 | 3.2 |
| 35 | NH₄Br | 200 | 9.4 | 3.2 |
| 36 | None | None | 20.4 | 10.2 |
| 37 | NaCl | 100 | 18.8 | 7.4 |
| 38 | NH₄Br | 200 | 10.5 | 3.6 |
| 39 | NaH₂PO₄ | 200 | 148.5 | 105.8 |

-continued

| Example | NCS Additive | NCS Concentration (ppm) | Avg.Initial Resistivity (milliohm.cm) | Avg. Aged Resistivity (milliohm.cm) |
|---|---|---|---|---|
| 40 | Na$_2$S | 200 | 41.7 | 13.5 |
| 41 | None | None | 17.6 | 8.3 |
| 42 | NaCl | 100 | 12.0 | 4.2 |
| 43 | MBl | 100 | 164.5 | 24.6 |
| 44 | MBl | 200 | 207.8 | 43.9 |

As can be seen, the resistivity characteristics of electroconductive compositions made in accordance with the invention are in the substantial majority of cases improved vis-a-vis the control embodiments. In testing of compositions formed with conductive composites utilizing Ag/Al particles (Examples 5–7, 9–11, 13–15, 17, 18, 20, 22, 23, 25, 26 and 28–31), utilization of chlorine (chloride) as the NCS gave good results uniformly. In some instances, use of sulfur as the NCS did not always result in improvement, but I deduce from this that the effect of the NCS was extraneously blocked or decreased (perhaps because the substance in which it was incorporated was not compatible with aluminum, because of unfavorable prevailing conditions such as pH, because of stearic hindrance, or because the NCS was taken up at least partially by the production equipment, etc.), since in Example 31 sulfur worked well. For compositions formed with Ag/Cu particles having no NCS or with conductive composites utilizing Ag/Cu particles (Examples 32–44), the aged resistivity values of all electroconductive compositions tested decreased. This behavior is in my experience sometimes observed with such materials in accelerated aging tests; of course, under ambient storage or use conditions in real time the resistivity values of all the compositions should increase to a greater or lesser extent. Nevertheless, even though the absolute aged resistivity values for the copper-core Examples were seemingly anomalous, relative to one another they still show that with the instant invention aged resistivity is typically lower than with the control embodiments. In Examples 39, 43 and 44, the results may be explicable simply because the effect of the NCS was extraneously blocked or decreased (perhaps because it or the substance in which it was incorporated was not compatible with copper, because of unfavorable prevailing conditions such as pH, because of stearic hindrance, or because the NCS was taken up at least partially by the production equipment).

EXAMPLES 45–52

Electroconductive compositions containing conductive composites utilizing Ag/Al particles in accordance with the invention, for use in real-time aging tests of resistivity, were prepared as Examples 46, 48, 50 and 52, generally following the same procedure discussed in connection with the previously presented Examples of this invention. Also, control embodiments were prepared as Examples 45, 47, 49 and 51, again generally following the same procedure discussed in connection with the previously presented control Examples, to demonstrate resistivity results when the effective nucleophilic chemical species is not included. Specimens were produced and initial volume resistivity determined along the lines discussed for Examples 4–44. However, instead of holding the compositions at temperature 200° C. for 48 hours, the specimens were tested intermittently during storage at room temperature for periods of up to forty-seven days, so that resistivity performance in real time could be studied.

The results of such tests over time up to thirteen days, on a series of gaskets formed using Ag/Al particles or conductive composites based on Ag/Al particles, and containing either no NCS or an NCS resulting from addition of NaCl as indicated, wish said conductive composite having NCS concentration also as indicated, are reported in the following table.

| Example | NCS | Avg.Initial Resistivity (milliohm.cm.) | Avg. Resistivity After 6 Days (milliohm.cm) | Avg. Resistivity After 13 Days (milliohm.cm. |
|---|---|---|---|---|
| 45 | None | 3.57 | 3.93 | 3.94 |
| 46 | NaCl | 2.33 | 2.27 | 2.26 |
| 47 | None | 3.55 | 3.96 | 4.10 |
| 48 | NaCl | 2.02 | 2.11 | 1.98 |

Further results of testing as aforesaid over time of up to forty-seven days, on a series of gaskets formed using Ag/Al particles or conductive composites based on Ag/Al particles, and containing either no NCS or an NCS resulting from addition of NaCl as indicated, with said conductive composite having NCS concentration also as indicated, are reported in the following table.

| Example | NCS | Avg.Initial Resistivity (milliohm.cm) | Avg. Resistivity After 6 Days (milliohm.cm) | Avg. Resistivity After 13 Days (milliohm.cm) | Avg. Resistivity After 21 Days (milliohm.cm) | Avg. Resistivity After 47 Days (milliohm.cm) |
|---|---|---|---|---|---|---|
| 49 | None | 3.57 | 3.93 | 3.94 | 4.48 | 4.45 |
| 50 | NaCl | 2.33 | 2.27 | 2.26 | 2.32 | 2.04 |
| 51 | None | 3.55 | 3.96 | 4.10 | 4.53 | 4.54 |
| 52 | NaCl | 2.02 | 2.11 | 1.98 | 1.95 | 1.92 |

In each of the Examples incorporating an effective nucleophilic chemical species resistivity increased to an extent far less than with the control Examples. It is my experience that end-users of electroconductive compositions of the type here concerned typically judge the resistivity performance of such compositions by comparing initial volume resistivity values with values after 21 days. Accordingly, it will be noted that results with the invention were demonstrated by Examples 49–52 to be superior even when utilizing time periods in excess of normal customer standards.

The terms and expressions which have been employed are used as terms of description and not of limitation, and there is no intention in the use of such terms and expressions of excluding any equivalents of the features shown and described, or portions thereof. It will be recognized that various modifications are possible within the scope of the invention claimed.

I claim:

1. An electroconductive composition comprising a polysiloxane matrix, electroconductive particles dispersed therein and an amount of a nucleophilic chemical species capable of impeding an increase in the resistivity of said composition for at least 21 days, said species being substantially unreactive with said particles and said matrix, and not causing any substantial impairment of the tear strength and tensile strength properties of said matrix.

2. A composition as defined in claim 1, wherein the nucleophilic chemical species is an ion of or otherwise comprising halogen, sulphur, phosphorus or nitrogen, or is a moiety comprising halogen, sulfur, phosphorus or nitrogen covalently bonded to or coordinated with one or more other atoms.

3. A composition as defined in claim 2, wherein said nucleophilic chemical species is bromide ion, chloride ion, fluoride ion, sulfate ion, sulfite ion, sulfide ion, phosphate ion, phosphite ion, nitrate ion, nitrite ion, or bromine, chlorine, fluorine or sulfur covalently bonded to or coordinated with one or more other atoms.

4. A composition as defined in claim 3, wherein the nucleophilic chemical species is chloride ion.

5. A composition as defined in claim 1, wherein the matrix is a diorganopolysiloxane matrix.

6. A composition as defined in claim 1, wherein the nucleophilic chemical species is present in an amount of from 0.002 to 0.04 weight percent of the composition.

7. A composition as defined in claim 1, wherein the nucleophilic chemical species is dispersed within the matrix.

8. A composition as defined in claim 1, wherein said particles constitute from 15 to 80 weight percent of said composition.

9. A conductive composition as defined in claim 1, in the form of a gasket.

10. A method of forming an electroonductive composition, which comprises combining electroconductive particles and one or more precursor components capable of being formed into an polysiloxane matrix, further incorporating in said combination a nucleophilic chemical species, and curing said one or more precursor components to form said matrix, said nucleophilic chemical species being substantially unreactive with said particles and said matrix, and being incorporated in said combination in all amount such that there is sufficient species to impede an increase in the resistivity of the composition for at least 21 days but not an amount so great as to cause any substantial impairment of the tear strength and tensile strength properties of said matrix.

11. A composition made in accordance with the method of claim 10.

12. A method as defined in claim 10, wherein the nucleophilic chemical species is an ion of or otherwise comprising halogen, sulphur, phosphorous or nitrogen, or is a moiety comprising halogen, sulfur, phosphorus or nitrogen covalently bonded to or coordinated with one or more other atoms.

13. A method as defined in claim 10, wherein said nucleophilic chemical species is bromide ion, chloride ion, fluoride ion, sulfate ion, sulfite ion, sulfide ion, phosphate ion, phosphite ion, nitrate ion, nitrite ion, or bromine, chlorine, fluorine or sulfur covalently bonded to or coordinated with one or more other atoms.

14. A method as defined in claim 10, wherein the nucleophilic chemical species is chloride ion.

15. A method as defined in claim 10, which comprises incorporating said nucleophilic chemical species as a deposit on said electroconductive particles.

16. A composition made in accordance with the method of claim 15.

17. A method as defined in claim 10, wherein said nucleophilic chemical species is admixed with said electroconductive particles and said one or more precursor components of the polysiloxane matrix.

18. A composition made in accordance with the method of claim 17.

19. A method as defined in claim 17, wherein the amount of nucleophilic chemical species combined with said mixture is such that said species constitutes from 0.002 to 0.04 weight percent of the conductive composition.

20. A method as defined in claim 10, wherein said combination step comprises mechanical mixing.

21. A method as defined in claim 10, wherein a platinum-containing catalyst is incorporated in the mixture which is cured.

22. A method as defined in claim 10, wherein curing is effected at a temperature of from room temperature to 200° C.

23. A method as defined in claim 10, which further comprises configuring said electroconductive composition as a gasket.

* * * * *